(12) United States Patent
Sakai et al.

(10) Patent No.: US 7,009,792 B2
(45) Date of Patent: Mar. 7, 2006

(54) METHOD AND APPARATUS FOR DATA REPRODUCING IN A DISK DRIVE

(75) Inventors: Yuji Sakai, Ome (JP); Koji Osafune, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 10/674,506

(22) Filed: Oct. 1, 2003

(65) Prior Publication Data
US 2004/0075930 A1    Apr. 22, 2004

(30) Foreign Application Priority Data
Oct. 1, 2002    (JP)    ............... 2002-288909

(51) Int. Cl.
*G11B 5/09*    (2006.01)

(52) U.S. Cl. .................. 360/39; 360/69; 360/31; 360/55; 360/53; 360/25

(58) Field of Classification Search ........... 360/25, 360/39, 46, 53, 55, 67–69, 75, 65, 31–32, 360/78.04, 77.02, 78.07

See application file for complete search history.

(56) References Cited

U.S. PATENT DOCUMENTS

| 4,656,533 A | * | 4/1987 | Sakai et al. | ............... 360/65 |
| 4,772,964 A | * | 9/1988 | Kaida | .................... 360/67 |
| 5,396,375 A | * | 3/1995 | Nagase et al. | ........... 360/46 |

FOREIGN PATENT DOCUMENTS

EP          1 003 155 A1    5/2000

(Continued)

OTHER PUBLICATIONS

Ho, et al., "Data Storage and Retrieval Using Perpendicular Media and Magnetoresistive Read Transducer", Jul. 1997, IEEE Transactions on Magnetics, vol. 33, No. 4, pp. 2538-2542.*

(Continued)

*Primary Examiner*—David Hudspeth
*Assistant Examiner*—Natalia Figueroa
(74) *Attorney, Agent, or Firm*—Pillsbury Winthrop Shaw Pittman, LLP (57) ABSTRACT

A perpendicular magnetic recording type of disk drive having function of removing a component of a shift in a base line of a reproducing signal is to be disclosed. The disk drive has a read channel including an extracting unit which extracts the component of the shift in the base line of the reproducing signal. The extracting unit includes low-pass filters, and parameters of a lower cut-off frequency of the low-pass filter are adjusted in read operation.

12 Claims, 7 Drawing Sheets

U.S. PATENT DOCUMENTS

| | | | |
|---|---|---|---|
| 5,995,313 A | 11/1999 | Dakroub | |
| 5,999,348 A * | 12/1999 | Dakroub | 360/46 |
| 6,078,453 A * | 6/2000 | Dziallo et al. | 360/55 |
| 6,091,560 A | 7/2000 | Du | |
| 6,178,053 B1 * | 1/2001 | Narita | 360/25 |
| 6,501,611 B1 * | 12/2002 | Li | 360/67 |
| 6,621,649 B1 * | 9/2003 | Jiang et al. | 360/67 |
| 2002/0089773 A1 | 7/2002 | Shimomura et al. | |

FOREIGN PATENT DOCUMENTS

| | | | |
|---|---|---|---|
| JP | 04-286702 | * | 10/1992 |
| JP | 04-372774 A | | 12/1992 |
| JP | 07-225901 | | 8/1995 |
| JP | 11-120702 | * | 4/1999 |
| JP | 2001-266301 | * | 9/2001 |
| JP | 2002-133604 A | | 5/2002 |

OTHER PUBLICATIONS

Austrian Search Report for Appln. No. 200304986-3, dated Jun. 18, 2004.

Japanese Office Action dated May 31, 2005 for Appln. No. 2002-288909.

* cited by examiner

FIG. 11

METHOD AND APPARATUS FOR DATA REPRODUCING IN A DISK DRIVE

CROSS-REFERENCE TO RELATED APPLICATIONS

This application is based upon and claims the benefit of priority from the prior Japanese Patent Application No. 2002-288909, filed Oct. 1, 2002, the entire contents of which are incorporated herein by reference.

BACKGROUND OF THE INVENTION

1. Field of the Invention

The present invention generally relates to a field of disk drives, particularly relates to a read channel applied to a perpendicular magnetic recording type of disk drive.

2. Description of the Related Art

Recently, in the field of the disk drive, a perpendicular magnetic recording type of disk storage apparatus which can improve recording density receives attention.

In the conventional longitudinal magnetic recording type of disk drive, magnetization corresponding to recording data (binary data, 0 or 1) is formed in a longitudinal direction of a disk medium. On the other hand, in the perpendicular magnetic recording type of disk drive, the magnetization is formed in a depth direction of the disk medium.

Generally, the disk drive, data is recorded on the disk medium by a coding method of NRZ (non return to zero) recording. When the recording data is read from the disk medium with a head, a reproducing signal (read signal) becomes a dipulse signal string in the longitudinal magnetic recording method. On the other hand, in the perpendicular magnetic recording method, the reproducing signal becomes a pulse signal string including a low-frequency component of direct current (DC).

Generally, in a read channel (reproducing signal processing system including a read amplifier) of the disk drive, an analog front-end circuit of the read amplifier, an AC coupling, or the like has lower cut-off frequency characteristics. This is because a low-frequency noise component is removed from the reproducing signal to improve SNR (signal-to-noise ratio) of the reproducing signal.

In the perpendicular magnetic recording method, since the reproducing signal includes the low-frequency component, when the analog front-end circuit having the lower cut-off frequency characteristics cuts the low-frequency component, a phenomenon in which a base line of the reproducing signal is shifted is observed. When the shift in the base line of the reproducing signal occurs, a problem in which an error rate is increased occurs in decoding the recording data from the reproducing signal.

In order to improve the above-described problem, it is thought that the lower cut-off frequency of the read channel is decreased. However, when a passing band is simply broadened, the low-frequency noise component can not be cut, which results in degradation in SNR of the reproducing signal.

Since the read amplifier is particularly sensitive to the general low-frequency noise such as a 1/f noise, SNR is further degraded. Accordingly, when the lower cut-off frequency of the read channel is decreased in the perpendicular magnetic recording method, the error rate is inversely increased.

Conventionally, the method which can compensate the low-frequency component to cope with the shift in the base line has been proposed (For example, Jpn. Pat. Appln. KOKAI Publication No. 11-120702). However, it is difficult that the conventional method is applied to the perpendicular magnetic recording type of disk drive and the shift in the base line of the reproducing signal is efficiently eliminated.

BRIEF SUMMARY OF THE INVENTION

In accordance with one embodiment of the present invention, there is provided a disk drive which is applied to the perpendicular magnetic recording method and has function of removing the component of the shift in the base line of the reproducing signal.

The disk drive comprises a head which reads out a data signal recorded in a disk medium and a read channel which reproduces recording data from the data signal outputted from the head, wherein the read channel includes a signal processing unit having lower cut-off frequency characteristics and including a filter circuit carrying out removal of low-frequency noise of the data signal, an extracting unit which extracts a component of a shift in a base line of the data signal processed by the signal processing unit, a compensating unit which removes the component of the shift in the base line from the data signal, and a decoding unit which decodes the recording data from the data signal.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Preferred embodiments of the invention will be described below referring to the accompanying drawings.

(Configuration of Disk Drive)

Figure 1:
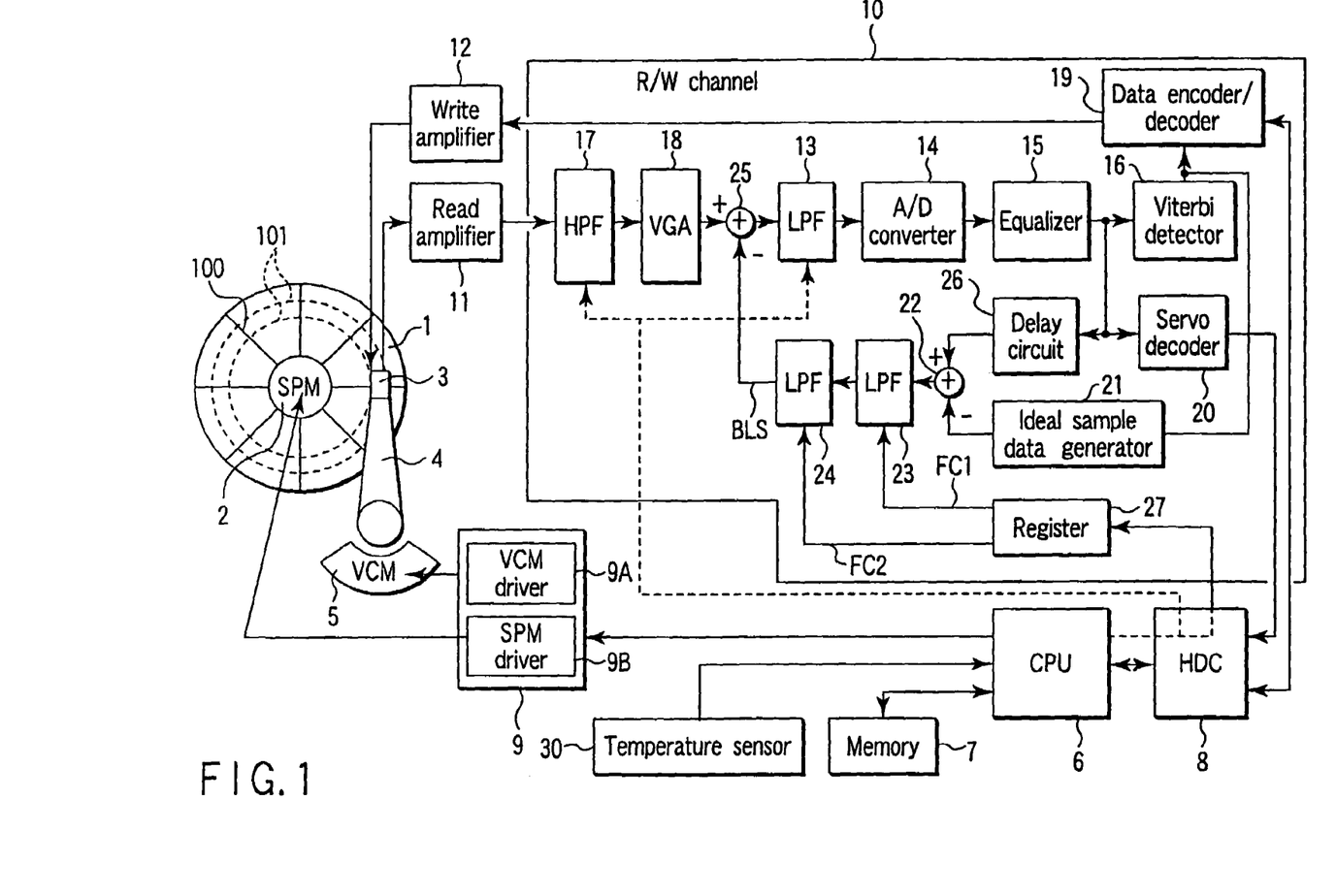
FIG. 1 is a block diagram showing a main part of a disk drive according to an embodiment of the invention.

FIG. 1 is a block diagram showing a main part of a disk drive according to the embodiment.

As shown in FIG. 1, the disk drive of the embodiment includes a disk medium (hereinafter simply referred to as disk) 1 having magnetic anisotropy in a vertical direction, a spindle motor (SPM) 2 rotating the disk 1, and an actuator 4 mounting a head 3.

The actuator 4 moves the head 3 in a radial direction of the disk 1 by driving force of a voice coil motor (VCM) 5. The head 3 includes a read head element which outputs a reproducing signal (read signal) read from the disk 1 and a write head element which records data in writing operation.

The disk drive further includes a microprocessor (CPU) 6, a memory 7, a hard disk controller (HDC) 8, a motor driver 9, a read/write channel 10, and read/write amplifiers 11 and 12.

The motor driver 9 includes a VCM driver 9A which drives VCM 5 under control of the CPU 6 and an SPM driver 9B which drives SPM 2 under control of the CPU 6. HDC 8 includes a host interface, a disk interface, and an interface to the CPU 6. The host interface is one between the disk drive and a host system such as a personal computer and a digital device. The disk interface is a data transfer interface to the read/write channel 10.

The CPU 6 is a main control device of the disk drive and a main element of a servo system for carrying out positioning control (servo control) of the head 3. The CPU 6 controls a seek operation and a track following operation using servo data reproduced by the read/write channel 10. Specifically, the CPU 6 drives and controls the VCM 5 of the actuator 4 through the VCM driver 9A. The memory 7 includes RAM, ROM, and a flash EEPROM. The memory 7 stores a control program of the CPU 6 and various kinds of control data.

In the disk drive, the CPU 6 sets or changes channel parameters for controlling the operation of the read/write channel 10 through the HDC 8. As described later, the channel parameters includes filter parameters of the HPF 17 and the LPF 13, which are included in the read channel 10, and parameters (FC1, FC2, G1, and G2) of the base-line-shift extracting unit. In particular, the CPU 6 sets or changes the parameters (FC1, FC2, G1, and G2) in a register 27, included in the read/write channel 10, through the HDC 8.

The read amplifier 11 amplifies the reproducing signal (read signal), read out from the read head element in the head 3, to transmit it to the read channel 10. The write amplifier 12 converts write data, outputted from the write channel, into recording current to transmit it to the write head element.

The read/write channel 10 is roughly divided into the write channel for processing the write data and the read channel for processing the reproducing signal. The read channel according to the embodiment will be mainly described below.

The read channel 10 is a signal processing system using a PRML (partial response maximum likelihood) method. The read channel 10 decodes and reproduces the recording data from the reproducing signal output from the read amplifier 11.

The read channel 10 includes a low-pass filter (LPF) 13, an A/D converter 14, a digital equalizer 15, a Viterbi detector 16, a high-pass filter (HPF) 17, and a variable gain amplifier (VGA) 18.

The LPF 13 removes the noise higher than a predetermined frequency from the reproducing signal. On the other hand, the HPF 17 is a lower cut-off frequency filter for cutting the unnecessary low-frequency noise from the reproducing signal. The HPF 17 and the read amplifier 11 have the lower cut-off frequency characteristics which are particularly adapted to the perpendicular magnetic recording method.

The A/D converter 14 converts the analog reproducing signal outputted from the LPF 13 into a digital signal. The equalizer 15 usually includes a digital FIR (Finite Impulse Response) filter and equalizes the digital signal in a desired PR (Partial Response) waveform. The Viterbi detector 16 is a maximum-likelihood decoder which carries out maximum-likelihood detecting-processing with a Viterbi algorithm.

A data encoder/decoder 19 carries out RLL (Run Length Limited) decoding processing for a data series detected by the Viterbi detector 16. In the write channel, the data encoder/decoder 19 carries out the RLL encoding processing for the write data. A servo decoder 20 decodes a servo data signal recorded in a servo area on the disk 1 from the digital signal outputted from the equalizer 15. The servo data signal is used for the positioning control of the head 3 by the CPU 6.

The read channel 10 includes the extracting unit for extracting the component of the shift in the base line of the reproducing signal. The extracting unit includes an ideal sample data generator 21, a subtracting circuit 22, low-pass filters (LPFs) 23 and 24 of a two-stage configuration, and a delay circuit 26. Further, the read channel 10 includes a removing circuit (a kind of the subtracting circuit) 25 which removes the component of the shift in the base line (BLS), extracted by the extracting unit, from the reproducing signal.

The ideal sample data generator 21 is a logic circuit which generates a sample data series after equalizing the ideal PR from the data series exactly decoded by the Viterbi detector 16. The delay circuit 26 delays the sample data (data series equalized to PR) outputted from the equalizer to output it to the subtracting circuit 22. The delay circuit 26 delays time corresponding to processing time required for the Viterbi circuit 16 and the generator 21. That is to say, the delay circuit 26 adjusts the time so that a phase of the sample data outputted from the equalizer corresponds to that of the ideal sample data.

The subtracting circuit 22 calculates an error between the sample data from the delay circuit 26 and the ideal sample data (at this point, the subtracting circuit 22 subtracts the ideal sample data from the sample data). The LPFs 23 and 24 remove a high-frequency signal component of an error signal from the subtracting circuit 22 and output the component of the shift in the base line (BLS) corresponding to the error to the removing circuit 25. The lower cut-off frequency, which is the filter parameters FC1 and FC2 set in a register 27, is set or changed by the CPU 6 in the LPFs 23 and 24.

(Structure of Disk)

As shown in FIG. 1, in the disk drive, a servo area 100 is formed at predetermined interval in a circumferential direction on the disk 1. The above-described servo data (including track address and servo burst data) is recorded in the servo area 100. On the other hand, many concentric data tracks 101 are formed in the radial direction on the disk 1. Each data track 101 is divided into data sectors for recording user data.

By the way, the recording method known as a ZBR (Zone Bit Recording) method has been realized in order to keep linear recording density constant in each data track unit. In the ZBR method, a group of data tracks 101 on the disk 1 is grouped in a unit referred to as zone (for example, 10 to 20 zones). The recording frequency and reproducing frequency of the data are equalized in each data track included in one zone. That is to say, though the recording frequency of the data is increased, as the data track is included in the zone located in the outer circumferential direction on the disk 1, the linear recording density becomes constant as a whole. In other words, in the ZBR method, though the recording frequency of each data track is constant within the same zone, the recording frequencies are different in the different zones. Accordingly, the data is recorded at higher recording frequency, as the data track is included in the zone located in the outer circumferential direction.

(Data Reproducing Operation)

Figure 4:
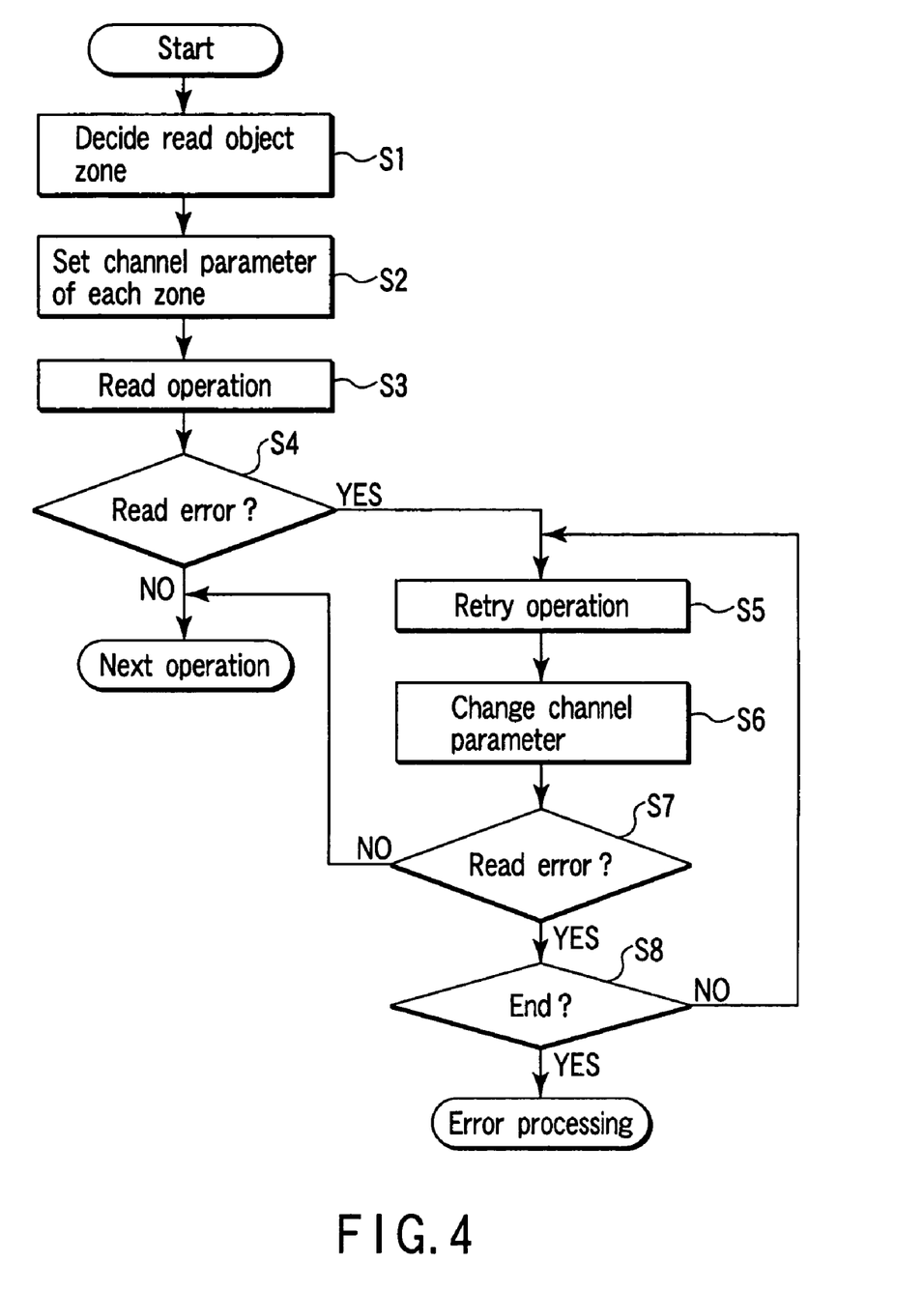
FIG. 4 shows a flow chart for explaining data reproducing operation according to the embodiment.

Referring to the flow chart of FIG. 4 with FIG. 1, data reproducing operation in the disk drive will be described below.

The CPU 6 decides a target data track (data track including the data sector of the accessing object) according to a read command designated from a host system through the HDC 8. Further, the CPU 6 decides the zone (read object zone) including the target data track (STEP S1).

Then, the CPU 6 selects the channel parameters corresponding to the read object zone, referring to a table previously stored in the memory 7. The channel parameters of each zone is set in the table. The CPU 6 set the selected channel parameters into the read channel 10 (STEP S2). The channel parameters includes the filter parameters of the HPF 17 and LPF 13 which are included in the read channel 10. The channel parameters also includes the parameters (FC1 and FC2) of the LPFs 23 and 24 which are included in the base-line-shift extracting unit.

The CPU 6 controls the actuator 4 through the VCM driver 9A, moves the head 3 in the radial direction on the disk 1, and positions the head 3 on the objective data track included in the read object zone. The reproducing signal read out by the read head element of the head 3 is transmitted from the objective data track to the read channel 10 through the read amplifier 11. The read channel 10 processes the inputted reproducing signal to carry out read operation in which the reproducing signal is decoded into the original recording data (write data) (STEP S3).

When the CPU 6 confirms through the HDC 8 that the reproducing data decoded by the read channel 10 is the error data, the CPU 6 carries out retry operation which is the read operation for the second time (YES in STEP S4 and STEP S5). The CPU 6 changes the channel parameters set in the read channel 10 in the retry operation (STEP S6). The CPU 6 repeats the predetermined maximum number of retry operations until the data can be normally decoded (STEP S7 and STEP S8).

(Extracting Operation of Component of Shift in Base Line)

In the perpendicular magnetic recording type of disk drive, the read amplifier 11 and the HPF 17, which have the lower cut-off frequency characteristics, are used. The HPF 17 are included in the read channel 10.

Figure 5:
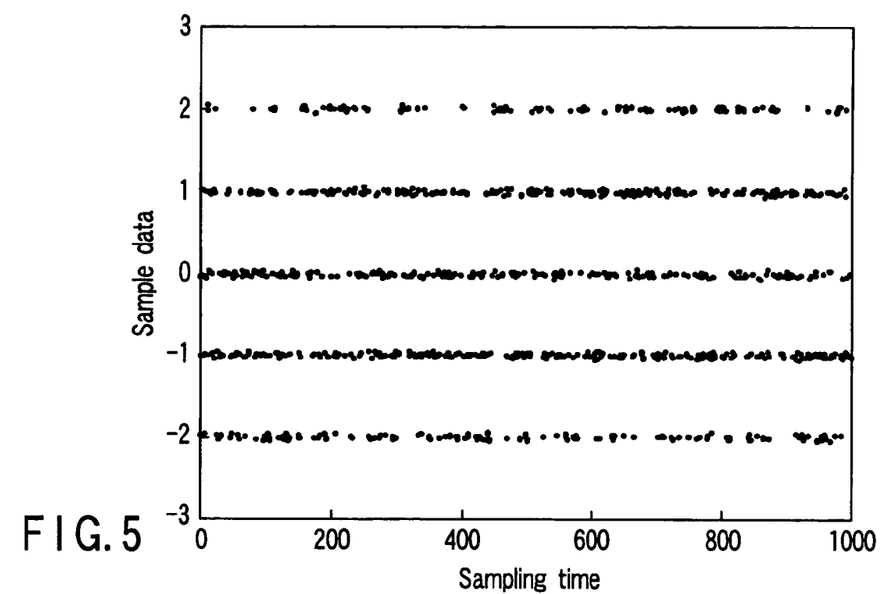
FIG. 5 shows an ideal sample data according to the embodiment.

FIG. 5 shows data characteristics corresponding to the sample data outputted from the equalizer 15 when each lower cut-off frequency of the read amplifier 11 and HPF 17 is sufficiently low compared with the frequency of the reproducing signal outputted from the read head element (for example, the lower cut-off frequency is not more than $1/10000$ of the maximum frequency of the reproducing signal).

At this point, in the PRML type of read channel 10, the equalizer 15 outputs the sample data equalized by, e.g. PR2 (Partial Response Class 2) for the digital signal outputted from the A/D converter 14. FIG. 5 shows the data in which the noise is not included in the reproducing signal for the sake of convenience. In the PR2 method, the response becomes (1, 2, 1) for NRZ coding data "1". The sample data equalized by the PR2 method has five amplitude levels of 0, 1, 2, 3, and 4. In FIG. 5, for the sake of convenience, the amplitude levels are expressed with −2, −1, 0, 1, and 2 assuming that the amplitude level of 2 is set to 0.

The ideal sample data generator 21 generates the sample data shown in FIG. 5 as the ideal sample data series from the data series exactly decoded by the Viterbi detector 16.

Figure 6:
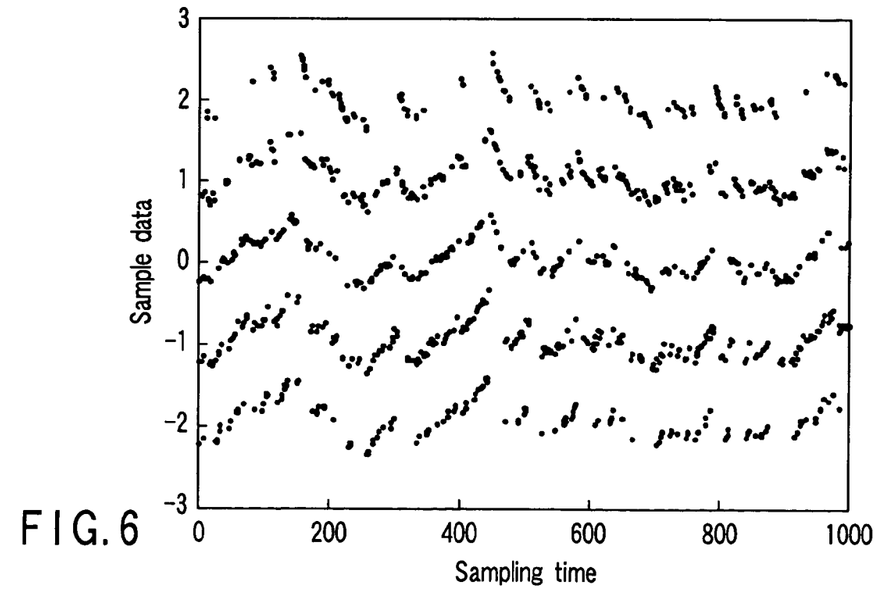
FIG. 6 shows an output sample data of an equalizer according to the embodiment.

On the other hand, FIG. 6 shows the data characteristics corresponding to the sample data outputted from the equalizer 15 when each lower cut-off frequency of the read amplifier 11 and HPF 17 is about $1/1000$ of the frequency of the reproducing signal (for example, the lower cut-off frequency is $2/1000$ of the maximum frequency of the reproducing signal). Even in this case, FIG. 6 shows the data in which the noise is not included in the reproducing signal for the sake of convenience. In contrast to the ideal sample data shown in FIG. 5, the sample data shown in FIG. 6 includes the component of the shift in the base line, which is caused by the influence of the low-frequency component of the reproducing signal cut off by the read amplifier 11 and HPF 17 which have the lower cut-off frequency characteristics.

The extracting operation of the component of the shift in the base line by the extracting unit will be described in the read/write channel 10 of the embodiment.

When the read operation is carried out, as described above, the reproducing signal outputted from the read head element is processed by the read channel 10 and decoded into the recording data (NRZ coding data). At this point, as shown in FIG. 6, the equalizer 15 outputs the sample data including the component of the shift in the base line. On the other hand, as shown in FIG. 5, the ideal sample data generator 21 generates the ideal sample data series (data equalized by the PR2 method). Usually the Viterbi detector 16 decodes the NRZ coding data. The ideal sample data generator 21 outputs the response data (1, 2, 1) for the input of "1" of the NRZ coding data from the Viterbi detector 16.

Figure 7:
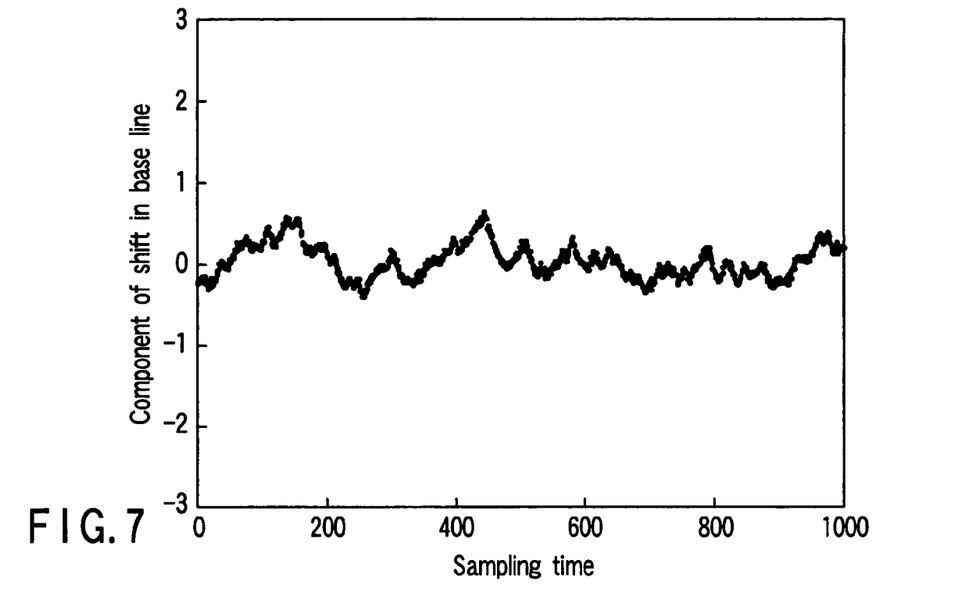
FIG. 7 shows output of a subtracting circuit according to the embodiment.

The subtracting circuit 22 calculates the error between the actual sample data from the delay circuit 26 and the ideal sample data (At this point, the subtracting circuit 22 subtracts the ideal sample data from the actual sample data). As shown in FIG. 7, the subtracting circuit 22 extracts the component of the shift in the base line (BLS) corresponding to the error.

As described above, the component of the shift in the base line is caused by the influence of the low-frequency component of the reproducing signal cut off by the read amplifier 11 and HPF 17. Therefore, the component of the shift in the base line includes the frequency component lower than each cut-off frequency of the read amplifier 11 and HPF 17.

Figure 8:
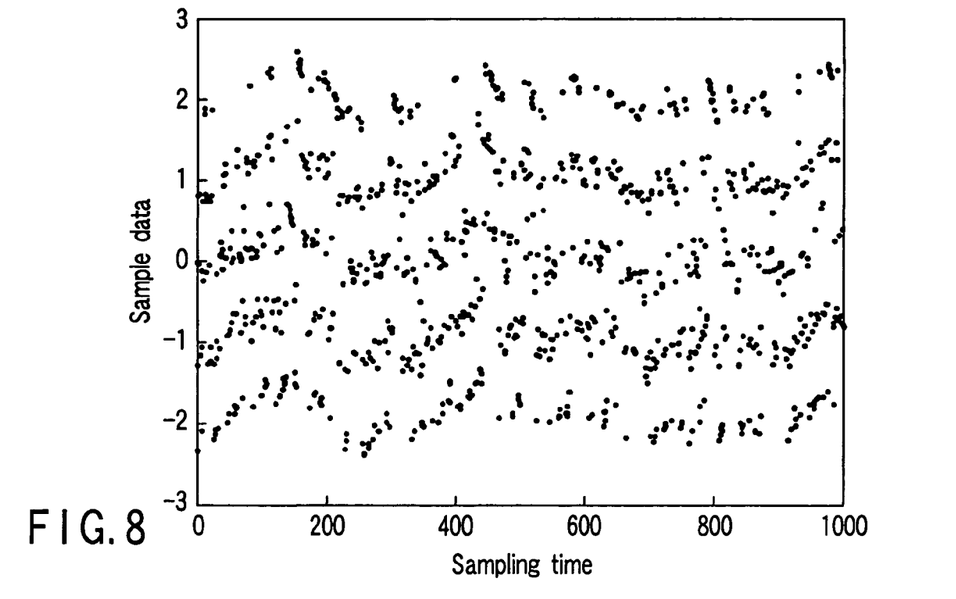
FIG. 8 shows output sample data including noise in the equalizer according to the embodiment.
Figure 9:
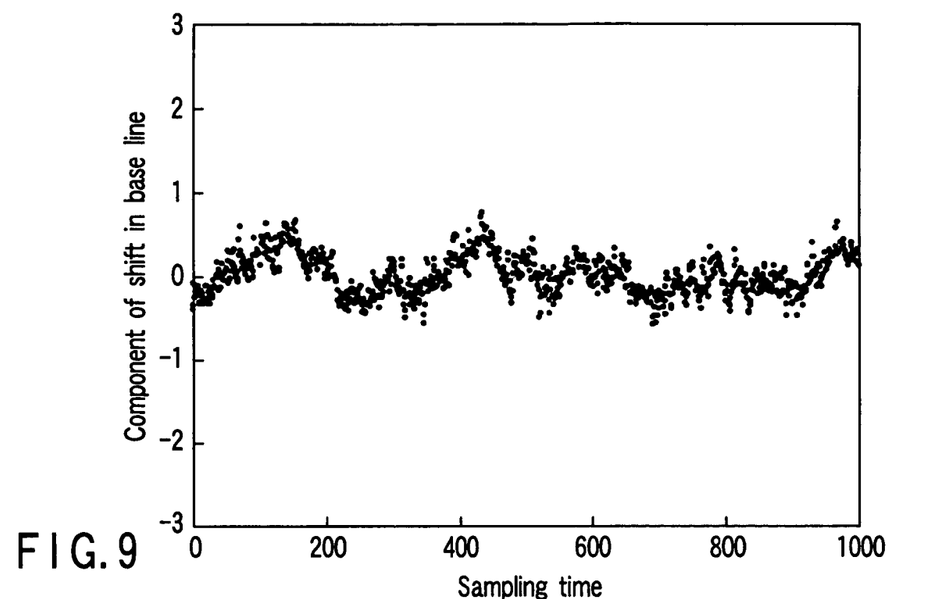
FIG. 9 shows output including noise in the subtracting circuit according to the embodiment.

Since the reproducing signal inputted to the read channel 10 actually includes the high-frequency noise, the equalizer 15 outputs the sample data including the noise component as shown in FIG. 8. Accordingly, as shown in FIG. 9, the subtracting circuit 22 also extracts the component of the shift in the base line including the noise component. As described above, the component of the shift in the base line includes the frequency component lower than each cut-off frequency of the read amplifier 11 and HPF 17, so that the unnecessary noise component can be removed from the component of the shift in the base line (BLS) by the LPFs 23 and 24 having the same cut-off frequency.

Figure 10:
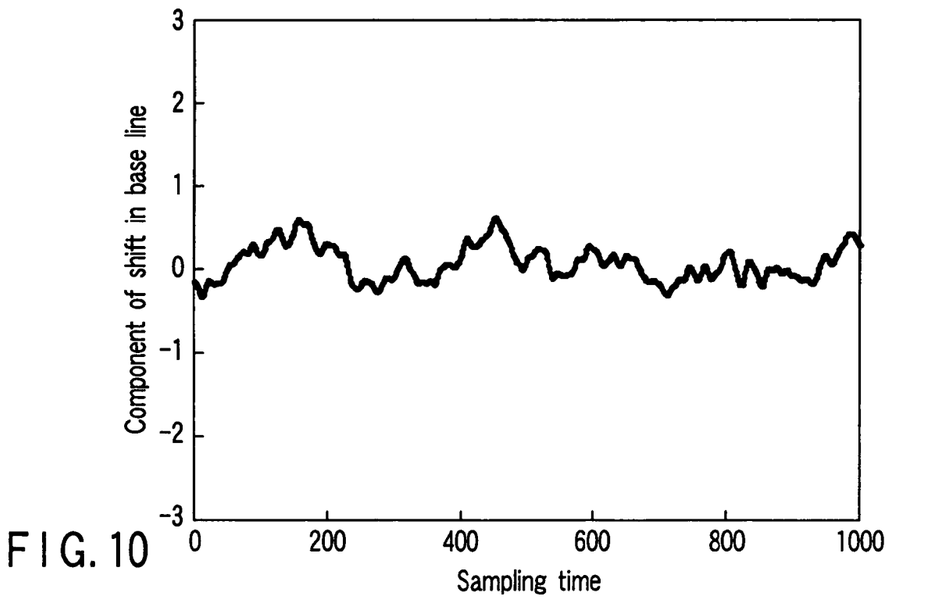
FIG. 10 shows output of an LPF according to the embodiment.

Generally the lower cut-off frequency characteristics of the read amplifier 11 have primary HPF characteristics. The HPF 17 has also the primary HPF characteristics. Accordingly, the primary LPF 23 which has the cut-off frequency close to the cut-off frequency of the read amplifier 11 is effective to the noise removal. The primary LPF 24 which has the cut-off frequency close to the cut-off frequency of the HPF 17 is also effective to the noise removal. FIG. 10 shows the output of the LPF 24 and the component of the shift in the base line (BLS) in which the unnecessary high-frequency noise is removed.

In short, the LPFs 23 and 24 removes the high-frequency noise component from the error signal outputted from the subtracting circuit 22 and outputs the component of the shift in the base line (BLS) corresponding to the error signal. The lower cut-off frequency, which is the filter parameters FC1 and FC2 set in the register 27 by the CPU 6, is set or changed in the LPFs 23 and 24.

Figure 11:
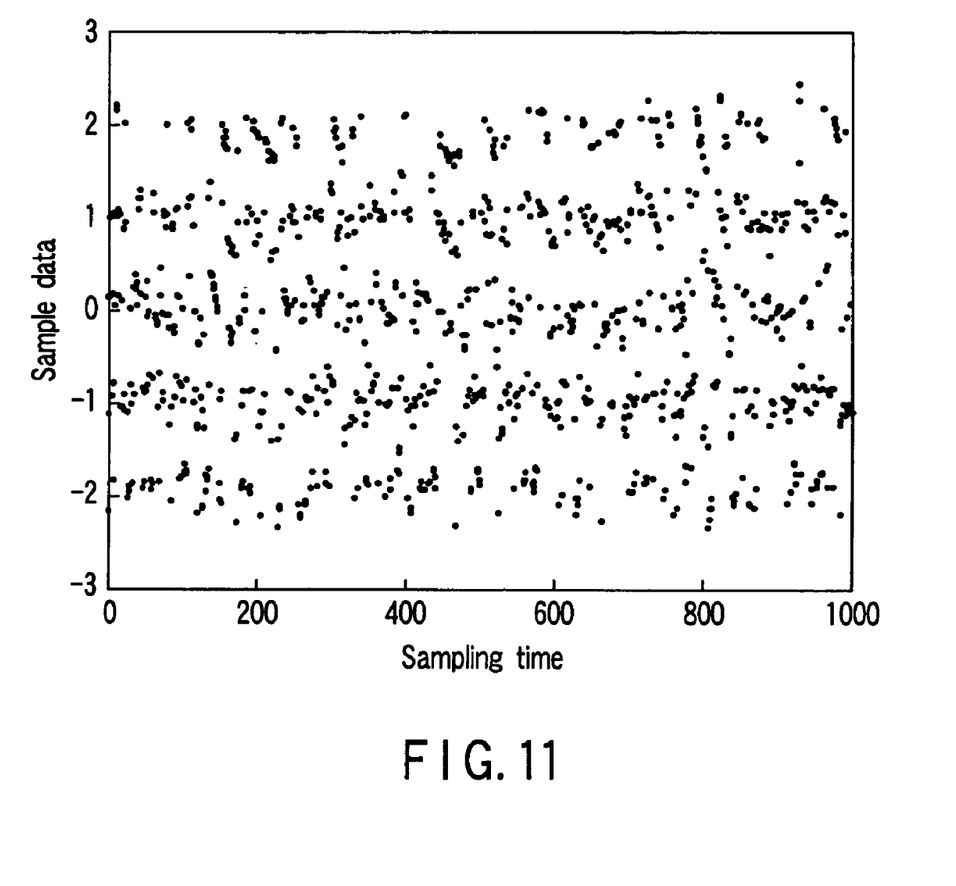
FIG. 11 shows sample data after removing the component of the shift in the base line in the equalizer according to the embodiment.

The removing circuit 25 removes the component of the shift in the base line (output signal BLS of the LPF 24) extracted from the reproducing signal outputted from the VGA 18 by the extracting unit. FIG. 11 shows the output of the sample data of the equalizer 15 obtained from the reproducing signal in which the component of the shift in the base line is removed. The removing circuit 25 may be formed to be placed at a fore-step of the VGA 18 and remove the component of the shift in the base line from the reproducing signal outputted from the HPF 17.

At this point, as described above, it is assumed that the read operation carried out in each zone by the ZBR recording method in the disk drive of the embodiment. The frequency of the reproducing signal in the read operation is different in each zone. Therefore, the component of the shift in the base line, caused by the lower cut-off frequency with the read amplifier 11 and HPF 17 is different in each zone.

The CPU 6 sets the lower cut-off frequency FC1 of the LPF 23 to a value close to the lower cut-off frequency of the read amplifier 11 as the channel parameter. The CPU 6 also sets the lower cut-off frequency FC2 of the LPF 24 to a value close to the lower cut-off frequency of the HPF 17 as the channel parameter. However, when the lower cut-off frequency of the LPFs 23 and 24 is decreased, group delay is increased, which allows large feedback delay. This results in a trade-off in which a removing ratio of the component of the shift in the base line is decreased though the noise except the component of the shift in the base line is removed better. Accordingly, the CPU 6 adjusts each of the lower cut-off frequencies FC1 and FC2 of the LPFs 23 and 24 so that the error rate after decoding the data is minimized.

There is dispersion in the lower cut-off frequencies of the read amplifier 11 and HPF 17 in each drive. Therefore, the CPU 6 sets each of the lower cut-off frequencies FC1 and FC2 of the LPFs 23 and 24 into the read channel 10 through the HDC 8 in manufacturing the disk drive so that the error rate after decoding the data is minimized.

According to the embodiment, the component of the shift in the base line caused by a factor such as the read amplifier 11 or HPF 17 which has the lower cut-off frequency can be extracted and removed from the reproducing signal. Accordingly, the error rate caused by the factor of the component of the shift in the base line can be decreased in decoding the data. Further, in the read operation, each of the lower cut-off frequencies FC1 and FC2 of the LPFs 23 and 24 included as the channel parameter in the extracting unit of the component of the shift in the base line can be adjusted in each zone. This allows the channel parameter of the read channel 10 to be adjusted to the optimum value so that the error rate is minimized in decoding the data. Particularly, in the case the embodiment is applied to the perpendicular magnetic recording type of disk drive, the component of the shift in the base line, caused by the influence of the HPF 17 for processing the reproducing signal including the low-frequency component of DC, can be efficiently compensated.

(Modification)

For an example of modification of the embodiment, in the disk drive, the CPU 6 monitors the change in temperature of an inside or environment of the disk drive with a temperature sensor 30 and adjusts each of the lower cut-off frequencies FC1 and FC2 of the LPFs 23 and 24 according to the change in the temperature.

In the case that the temperature of the inside or the environment of the disk drive has been changed, the parameter such as the low-frequency characteristics of the read amplifier 11 and the lower cut-off frequency of the HPF 17 is usually changed. The CPU 6 can exactly extract the component of the shift in the base line and remove it from the reproducing signal in such a manner that the CPU 6 adjusts each of the lower cut-off frequencies FC1 and FC2 of the LPFs 23 and 24 according to the change in the temperature. Accordingly, compensating-processing can be carried out for the component of the shift in the base line so that the error rate after decoding the data is minimized.

(Another Embodiment)

Figure 2:
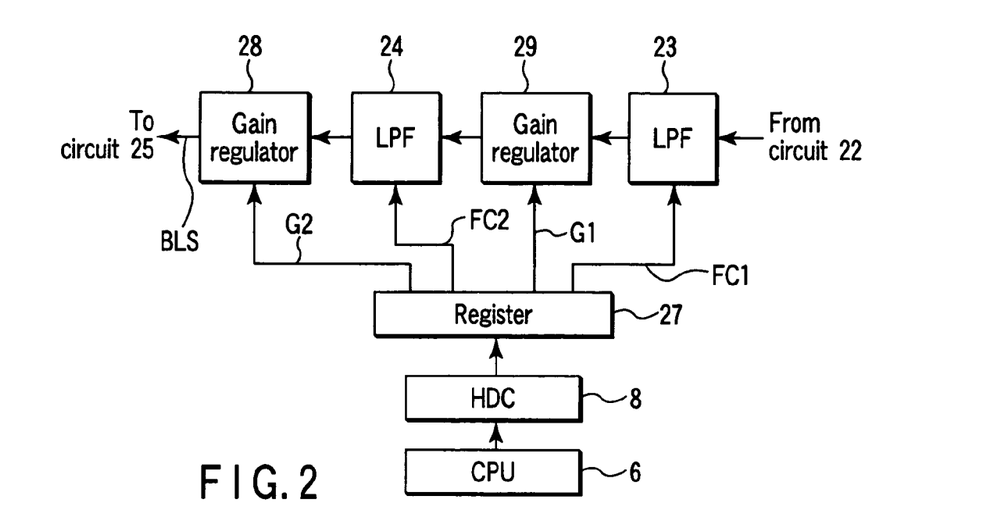
FIG. 2 shows a block diagram according to another embodiment.

FIG. 2 shows a block diagram according to another embodiment.

The embodiment shown in FIG. 2 has a structure in which the extracting unit of the component of the shift in the base line includes gain regulators 28 and 29 and LPFs 23 and 24 for suppressing the high-frequency noise.

In the embodiment, in addition to the setting of the each of the lower cut-off frequencies FC1 and FC2 of the LPFs 23 and 24, the CPU 6 sets gains G2 and G1 of the gain regulators 28 and 29 through the HDC 8 for the register 27 included in the read channel 10.

The component of the shift in the base line, included in the reproducing signal (sample data), can be extracted with high precision and removed from the reproducing signal by adopting such a structure.

(Still Another Embodiment)

Figure 3:
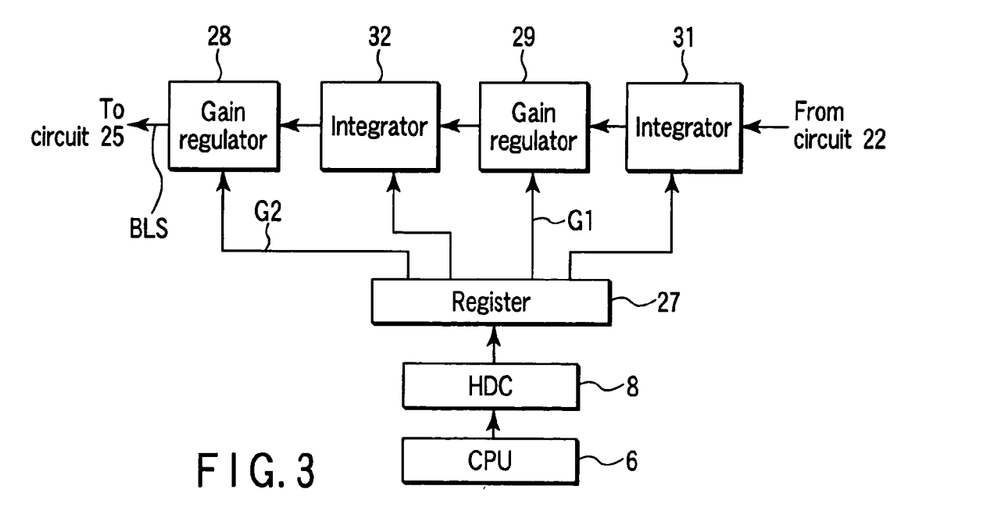
FIG. 3 shows a block diagram according to still another embodiment.

FIG. 3 shows a block diagram according to still another embodiment.

The embodiment shown in FIG. 3 has a structure in which the extracting unit of the component of the shift in the base line includes gain regulators 28 and 29 and integrators 31 and 32 which have high-frequency cut-off characteristics for suppressing the high-frequency noise. The integrators 31 and 32 integrate the signal inputted from the circuit 22 and include a digital integrator and an analog integrator.

In the embodiment, the CPU 6 sets gains G2 and G1 of the gain regulators 28 and 29 through the HDC 8 for the register 27 included in the read channel 10.

The component of the shift in the base line, included in the reproducing signal (sample data), can be extracted with high precision and removed from the reproducing signal by adopting such a structure.

As described above in detail, according to the embodiments, the component of the shift in the base line caused by the lower cut-off frequency characteristics of the analog circuit for processing the reproducing signal can be securely extracted and removed from the reproducing signal. Accordingly, particularly in the case that the invention is applied to the perpendicular magnetic recording type of disk drive, the error rate can be improved in the data decoding processing. In particular, when the invention is applied to the perpendicular magnetic recording type of disk drive which processes the reproducing signal including the pulse signal series containing the low-frequency component of DC, it is effective.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive for perpendicular magnetic recording, comprising:
    a head which reads out a data signal recorded in a disk medium; and
    a read channel which includes a signal processing unit having lower cut-off frequency characteristics and including a high-pass filter which carries out removal of low-frequency noise of the data signal outputted from the head and a decoding unit which decodes recording data from the data signal,
    wherein the read channel includes:
    an extracting unit which extracts a component of a shift in a base line of the data signal processed by the signal processing unit, and
    a compensating unit which removes the component of the shift in the base line from the data signal, and
    wherein the extracting unit has:
    a generator which generates an ideal data signal;
    a subtracting unit which outputs a difference data signal according to difference between the ideal data signal and a data signal processed by the signal processing unit; and
    an adjusting unit including a gain adjusting circuit and a high-frequency cut-off filter, which process the difference data signal, the adjusting unit generating a signal corresponding to the component of the shift in the base line.

2. The disk drive according to claim 1, further comprising a parameter adjusting unit which adjusts a cut-off frequency parameter of the high-frequency cut-off filter included in the extracting unit and a gain parameter set into the gain adjusting circuit.

3. A disk drive for perpendicular magnetic recording, comprising:
    a head which reads out a data signal recorded in a disk medium; and
    a read channel which includes a signal processing unit having lower cut-off frequency characteristics and including a high-pass filter which carries out removal of low-frequency noise of the data signal outputted from the head and a decoding unit which decodes recording data from the data signal,
    wherein the read channel includes:
    an extracting unit which extracts a component of a shift in a base line of the data signal processed by the signal processing unit, and
    a compensating unit which removes the component of the shift in the base line from the data signal, and
    wherein the extracting unit has:
    a generator which generates an ideal data signal;
    a subtracting unit which outputs a difference data signal according to difference between the ideal data signal and a data signal processed by the signal processing unit; and
    an adjusting unit including a gain adjusting circuit and an integrating circuit, which have high-frequency cut-off characteristics processing the difference data signal, the adjusting unit generating a signal corresponding to the component of the shift in the base line.

4. The disk drive according to claim 3, further comprising a parameter adjusting unit which adjusts a gain parameter set into the gain adjusting circuit included in the extracting unit.

5. A disk drive using a disk medium in which a plurality of groups of data tracks for recording a data signal is formed by a perpendicular magnetic recording method and each group of data tracks is managed in each plurality of zones, comprising:
    a head to read out a data signal recorded in a disk medium in read operation; and
    a read channel to process the data signal outputted from the head by a PRML signal processing method to reproduce recording data,
    wherein the read channel includes:
    a high-pass filter circuit having lower cut-off frequency characteristics;
    a signal processing unit which generates sample data obtained from the data signal outputted from the high-pass filter circuit by a PR type of waveform equalizing processing;
    a decoding unit to decode the recording data from the sample data;
    an extracting unit which extracts a component of a shift in a base line included in the data signal according to difference data between the sample data and an ideal sample data; and
    a compensating unit which removes the component of the shift in the base line from the data signal to transmit the data signal to the signal processing unit, and
    wherein the decoding unit includes a Viterbi detector which carries out ML type of data detection processing from the sample data, and which further comprises a generator which generates the ideal sample data from a data series detected by the Viterbi detector.

6. A disk drive using a disk medium in which a plurality of groups of data tracks for recording a data signal is formed by a perpendicular magnetic recording method and each group of data tracks is managed in each plurality of zones, comprising:
    a head to read out a data signal recorded in a disk medium in read operation; and
    a read channel to process the data signal outputted from the head by a PRML signal processing method to reproduce recording data,
    wherein the read channel includes:
    a high-pass filter circuit having lower cut-off frequency characteristics;
    a signal processing unit which generates sample data obtained from the data signal outputted from the high-pass filter circuit by a PR type of waveform equalizing processing;
    a decoding unit to decode the recording data from the sample data;
    an extracting unit which extracts a component of a shift in a base line included in the data signal according to difference data between the sample data and an ideal sample data; and
    a compensating unit which removes the component of the shift in the base line from the data signal to transmit the data signal to the signal processing unit, and
    wherein the extracting unit includes an integrating circuit and a gain adjusting circuit which have high-frequency cut-off characteristics processing the difference data signal, and which further comprises a parameter adjusting unit which adjusts a gain parameter set in the gain adjusting circuit according to a zone of a read object decided in the read operation.

7. A disk drive using a disk medium in which a plurality of groups of data tracks for recording a data signal is formed by a perpendicular magnetic recording method and each group of data tracks is managed in each plurality of zones, comprising:
   a head to read out a data signal recorded in a disk medium in read operation; and
   a read channel to process the data signal outputted from the head by a PRML signal processing method to reproduce recording data,
   wherein the read channel includes:
   a high-pass filter circuit having lower cut-off frequency characteristics;
   a signal processing unit which generates sample data obtained from the data signal outputted from the high-pass filter circuit by a PR type of waveform equalizing processing;
   a decoding unit to decode the recording data from the sample data;
   an extracting unit which extracts a component of a shift in a base line included in the data signal according to difference data between the sample data and an ideal sample data; and
   a compensating unit which removes the component of the shift in the base line from the data signal to transmit the data signal to the signal processing unit, and
   wherein the extracting unit includes a high-frequency cut-off filter which processes the difference data signal, and which further comprises a parameter adjusting unit which adjusts a cut-off parameter of the high-frequency cut-off filter according to a temperature value detected in the read operation.

8. A disk drive using a disk medium in which a plurality of groups of data tracks for recording a data signal is formed by a perpendicular magnetic recording method and each group of data tracks is managed in each plurality of zones, comprising:
   a head to read out a data signal recorded in a disk medium in read operation; and
   a read channel to process the data signal outputted from the head by a PRML signal processing method to reproduce recording data,
   wherein the read channel includes:
   a high-pass filter circuit having lower cut-off frequency characteristics;
   a signal processing unit which generates sample data obtained from the data signal outputted from the high-pass filter circuit by a PR type of waveform equalizing processing;
   a decoding unit to decode the recording data from the sample data;
   an extracting unit which extracts a component of a shift in a base line included in the data signal according to difference data between the sample data and an ideal sample data; and
   a compensating unit which removes the component of the shift in the base line from the data signal to transmit the data signal to the signal processing unit, and
   wherein the extracting unit includes a high-frequency cut-off filter and a gain adjusting circuit which process the difference data signal, and which further comprises a parameter adjusting unit which adjusts a cut-off frequency parameter of the high-frequency cut-off filter and a gain parameter set in the gain adjusting circuit according to a temperature value detected in the read operation.

9. A disk drive using a disk medium in which a plurality of groups of data tracks for recording a data signal is formed by a perpendicular magnetic recording method and each group of data tracks is managed in each plurality of zones, comprising:
   a head to read out a data signal recorded in a disk medium in read operation; and
   a read channel to process the data signal outputted from the head by a PRML signal processing method to reproduce recording data,
   wherein the read channel includes:
   a high-pass filter circuit having lower cut-off frequency characteristics;
   a signal processing unit which generates sample data obtained from the data signal outputted from the high-pass filter circuit by a PR type of waveform equalizing processing;
   a decoding unit to decode the recording data from the sample data;
   an extracting unit which extracts a component of a shift in a base line included in the data signal according to difference data between the sample data and an ideal sample data; and
   a compensating unit which removes the component of the shift in the base line from the data signal to transmit the data signal to the signal processing unit, and
   wherein the extracting unit includes an integrating circuit and a gain adjusting circuit which have the high-frequency cut-off characteristics processing the difference data signal, and which further comprises a parameter adjusting unit which adjusts a gain parameter set in the gain adjusting circuit according to a temperature value detected in the read operation.

10. A disk drive using a disk medium in which a plurality of groups of data tracks for recording a data signal is formed by a perpendicular magnetic recording method and each group of data tracks is managed in each plurality of zones, comprising:
    a head to read out a data signal recorded in a disk medium in read operation; and
    a read channel to process the data signal outputted from the head by a PRML signal processing method to reproduce recording data,
    wherein the read channel includes:
    a high-pass filter circuit having lower cut-off frequency characteristics;
    a signal processing unit which generates sample data obtained from the data signal outputted from the high-pass filter circuit by a PR type of waveform equalizing processing;
    a decoding unit to decode the recording data from the sample data;
    an extracting unit which extracts a component of a shift in a base line included in the data signal according to difference data between the sample data and an ideal sample data; and
    a compensating unit which removes the component of the shift in the base line from the data signal to transmit the data signal to the signal processing unit, and
    wherein the extracting unit includes a high-frequency cut-off filter and a gain adjusting circuit which process the difference data signal, and which further comprises a retry control unit which carries out retry of the read operation in the case that data decoded by the decoding unit is error data in the read operation; and a parameter adjusting unit which adjusts a cut-off frequency parameter of the high-frequency cut-off filter and a gain parameter set in the gain adjusting circuit in the retry operation.

11. A disk drive for perpendicular magnetic recording, comprising:

a head which reads out a data signal recorded in a disk medium; and a read channel which includes a signal processing unit having lower cut-off frequency characteristics and including a high-pass filter which carries out removal of low-frequency noise of the data signal outputted from the head and a decoding unit which decodes recording data from the data signal, wherein the read channel includes:

an extracting unit which extracts a component of a shift in a base line of the data signal processed by the signal processing unit, and a compensating unit which removes the component of the shift in the base line from the data signal, and wherein the extracting unit includes a integrating circuit and a gain adjusting circuit which have the high-frequency cut-off characteristics processing the difference data signal, and which further comprises a retry control unit which carries out retry of the read operation in the case that data decoded by the decoding unit is error data in the read operation; and a parameter adjusting unit which adjusts a cut-off frequency parameter of the high-frequency cut-off filter and a gain parameter set in the gain adjusting circuit in the retry operation.

12. A read channel which is applied to a disk drive using a head to read out a data signal recorded in a disk medium by a perpendicular magnetic recording method and processes the data signal outputted from the head by a PRML signal processing method to reproduce recording data, comprising:

a high-pass filter having lower cut-off frequency characteristics;

a signal processing unit which generates sample data obtained from the data signal outputted from the high-pass filter circuit by a PR type of waveform equalizing processing;

a decoding unit to decode the recording data from the sample data;

an extracting unit which extracts a component of a shift in a base line included in the data signal according to difference data between the sample data and an ideal sample data, the extracting unit including an integrating circuit or a gain adjusting circuit which has a high-frequency cut-off filter or high-frequency cut-off characteristics and generating a signal corresponding to the component of the shift in the base line;

a compensating unit to remove the component of the shift in the base line from the data signal to transmit the data signal to the signal processing unit; and a register to adjust a cut-off frequency parameter of the high-frequency cut-off filter and a gain parameter set in the gain adjusting circuit.

\* \* \* \* \*